United States Patent [19]

Weber

[11] Patent Number: 5,072,174

[45] Date of Patent: Dec. 10, 1991

[54] MEASUREMENT CONFIGURATION COMPRISING AT LEAST ONE ELECTRONIC LINEAR MEASURING PROBE

[76] Inventor: Hans R. Weber, 10, chemin du Grillon, CH-1007 Lausanne, Switzerland

[21] Appl. No.: 450,433

[22] Filed: Dec. 14, 1989

[30] Foreign Application Priority Data

Dec. 21, 1988 [CH] Switzerland ............... 4729/88

[51] Int. Cl.$^5$ ............................................. G01R 1/06
[52] U.S. Cl. .................................... 324/149; 324/72.5; 324/158 P
[58] Field of Search ............... 324/72.5, 149, 158 P, 324/688, 690, 660–662, 680, 725, 158 R, 158 F

[56] References Cited

U.S. PATENT DOCUMENTS 3,781,676 12/1973 Williams .............................. 324/72.5
3,784,897 1/1974 Norrie ............................ 324/660 X
4,114,095 9/1978 Pankove et al. ................. 324/149 X Primary Examiner—Jack B. Harvey
Attorney, Agent, or Firm—Sherman and Shalloway

[57] ABSTRACT

A measurement configuration which is particularly suitable for multi-probe measurement configurations and contains at least one linear measuring probe (10) which can be connected without any supplementary electronic circuit to standard measuring instruments, computers and printers or other evaluation devices (16). A display and control unit (70) can be attached to the linear measurement probe (10) in order to monitor the measuring process at the measurement location, or to transform the linear measuring probe (10) into a dial gage with analog or digital readout. A transducer and an electronic circuit are located in a cylinder (1) in addition to the guide bush for the measuring spindle. The electronic circuit converts the signals from the transducer into normalized measuring signals which can be directly processed by an external evaluation device (16). A cable (46) with a connector contains leads for signal transmission and a duct for controlling the measuring spindle for pressure variation.

19 Claims, 3 Drawing Sheets

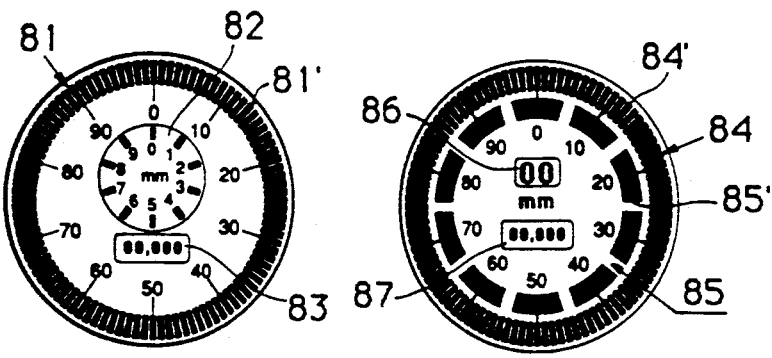
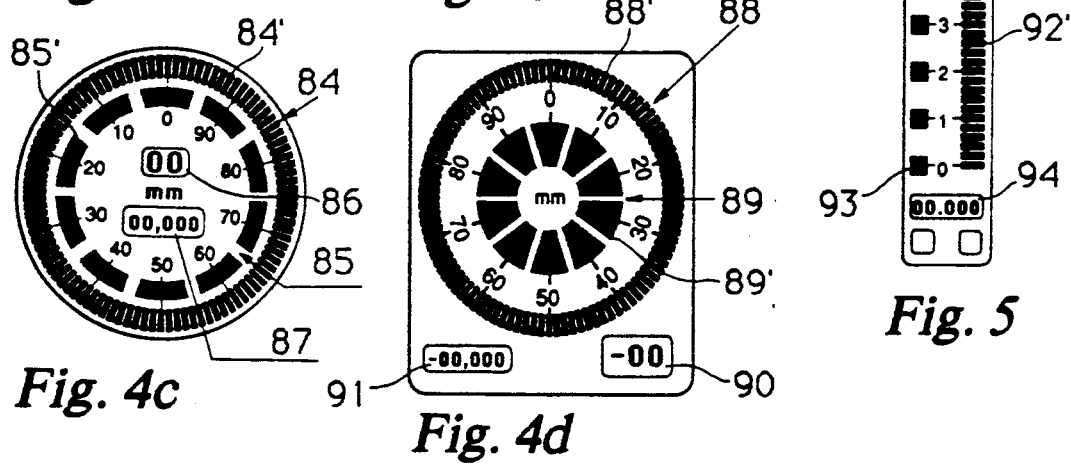
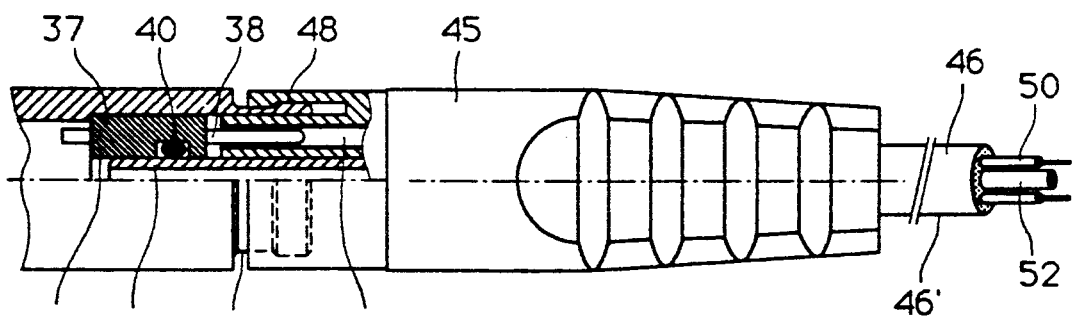
Fig. 6
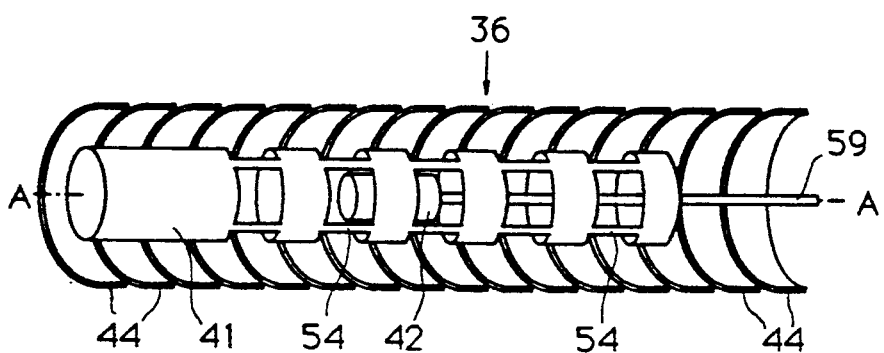
Fig. 7

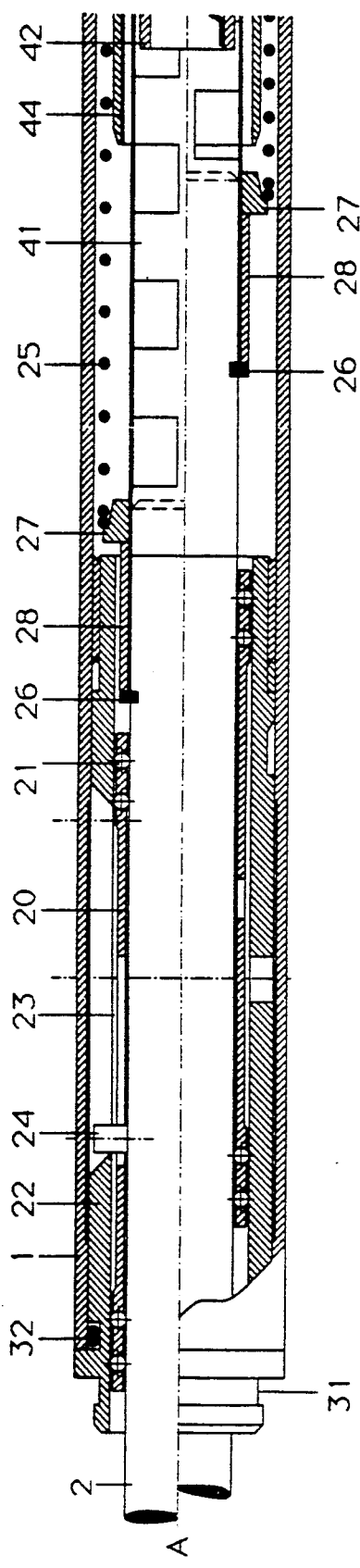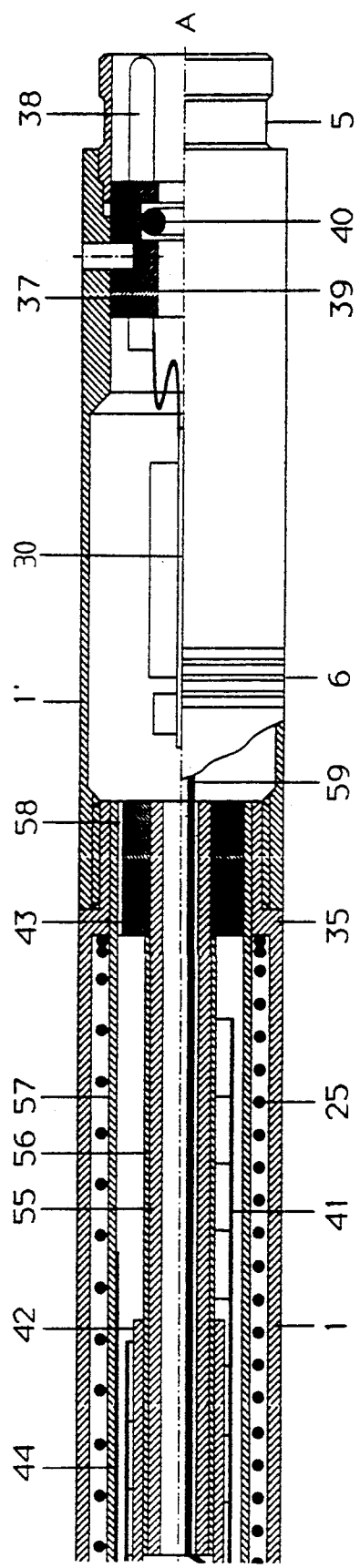
Fig. 8

MEASUREMENT CONFIGURATION COMPRISING AT LEAST ONE ELECTRONIC LINEAR MEASURING PROBE

The present invention relates to a measurement configuration in accordance with the generic part of claim 1.

Measurement configurations with electronic linear measuring probes are known in the art of metrology, being used for absolute or comparative measurements of linear quantities, for example dimensions or displacements. Depending on the application and/or the requirements in respect of ease of reading of the measurement, analog and/or digital displays and linear measuring probes of different designs are used. Conventional linear measuring probes incorporate a measuring element which is usually electronically readable and which as a result of linear displacement of the measuring spindle, causes a change in an inductive, capacitive, magnetic, optical or other quantity. Such linear measuring probes are connected with an externally located electronic circuit, normally accommodated in the display unit, by means of electrical cables, which circuit ensures adequate signal conditioning and conversion into signals which can be digitally displayed and evaluated. Since the signals generated in the linear measuring probes do not comply with any uniform standard, it is generally only possible for the linear measuring probes which are compatible with a particular measurement and display unit to be used, and the transfer of measurements to a standardized printer, computer or other standardized evaluation device can only occur once the signals have been formated in an interface unit. For this reason, more or less all linear measuring probes which are currently commercially available are mutually incompatible. This results in a one-sided tie once a supplier and a measurement and display unit type have been chosen. In view of the progressive nature of the computer industry and the efforts being put into standardization of interfaces this is a problem which must be overcome.

The commercially available electronic measurement gauges marketed under a number of names and in varying designs with integral linear measuring probes and digital displays do not represent a solution to this problem, being merely combinations of a linear measuring probe and a display unit with the appropriate electronic circuitry in a single housing. These are relatively bulky measuring instruments with limited applications and no standardized digital signal outputs which would enable them to be used with standardized evaluation devices. They are not generally suitable for process control applications and for use in multi-probe measurement configurations.

In multi-probe measurement configurations and in process control the measuring probe and display instrument are often separated by a considerable distance and must be connected by cable. The length of the cable between the measuring probe and display instrument for transferring the analog signals generated in the above-mentioned linear measuring probes is limited to a few meters since the reading is otherwise distorted and the susceptibility to electromagnetic and electrostatic interference is excessively high.

If, as is advantageous in many applications, the linear measuring probes are to be operated by remote control, the linear measuring probe must be connected to an additional lead, for example a pneumatic hose. In many cases this is disadvantageous, increases the susceptibility to faults and makes it more difficult to install the linear measuring probes, particularly with multi-probe measurement configurations. A further drawback is that the linear measuring probes known in the art cannot be used without connecting cables and external electronics and display units. The installation of measuring stations is therefore costly and complicated, particularly if the measurement and display unit is located at some distance from the measuring station, and the individual linear measuring probes have to be calibrated without a display being available at the measuring station.

It is the object of the present invention to create a measurement configuration comprising at least a linear measuring probe and optionally a display and control unit which can be linked with this without cables, which configuration does not share the disadvantages of the known configurations of this type and its components and offers advantages over the known measurement configurations with linear measuring probes, particularly in respect of its operation and potential applications. In particular, it is intended to simplify the construction and operation of multi-probe measurement configurations, to create compatibility with evaluation units made by different manufacturers, to increase the permissible cable lengths substantially, to enable—if required—cable-free operation with display and control at the measuring station location and to provide remote control of the measuring probe or spindle without additional cables or hoses. Furthermore, it is intended that the measurement configuration should provide the option of temporarily linking a linear measuring probe, which is connected by means of a cable to an externally located evaluation unit, with a display and control unit directly and on site, without interrupting the connection to the externally located evaluation unit.

This object is achieved in the invention by means of a measurement configuration as defined in claim 1.

Advantageous embodiments of the subject-matter of the invention and its components are described below with reference to the accompanying drawings in which:

FIGS. 4a, 4b, 4c and 4d show advantageous embodiments of various circular displays with digital fields for display and control units, as can be used in the measurement configuration in accordance with the invention;

FIG. 5 shows a display with a linear scale and digital window;

FIG. 6 shows a detail of the rear end region of the linear measuring probe, magnified and partially in section;

FIG. 7 shows a perspective view of a partially cutaway capacitive measurement element as advantageously used in the linear measuring probe in accordance with FIGS. 1 and 8;

FIG. 8 shows a partial longitudinal section through the linear measuring probe in accordance with FIG. 1.

Figures 1, 2A, 2B, 2C:
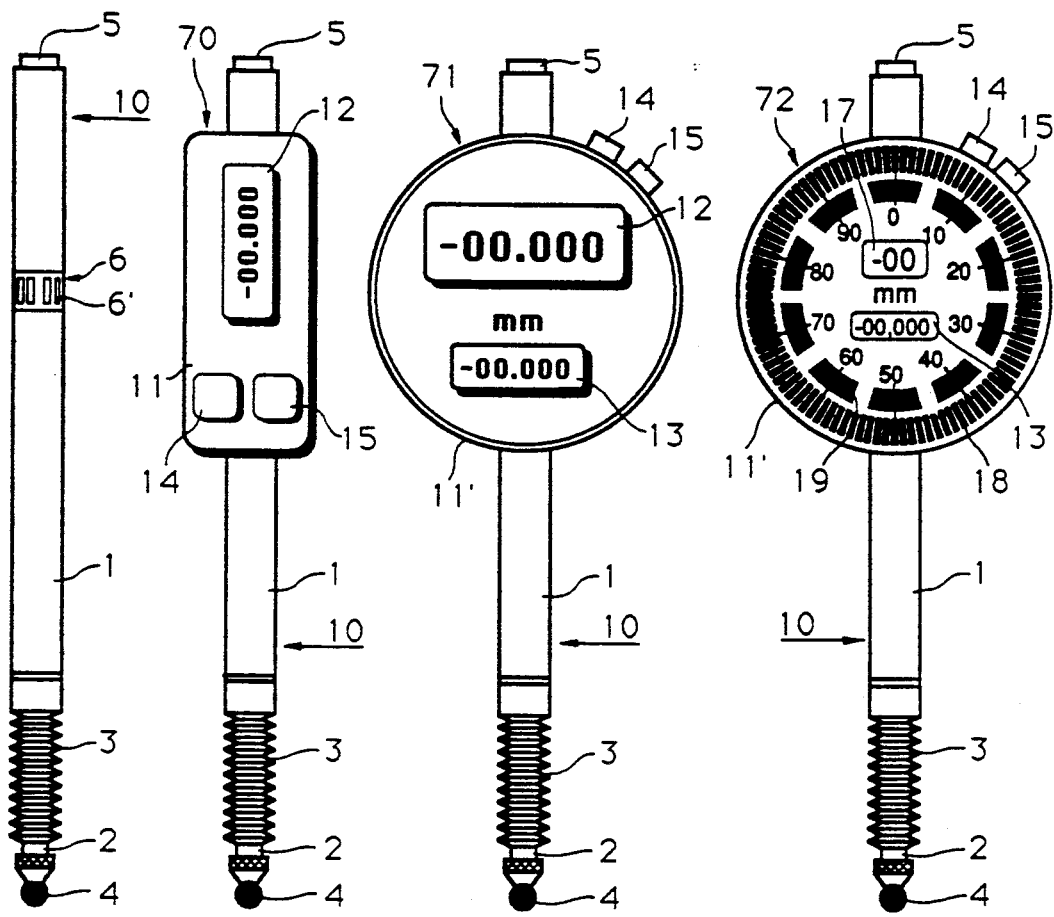
FIG. 1 shows a view of a linear measuring probe as advantageously used in a measurement configuration in accordance with the invention.
FIGS. 2a, 2b and 2c show the linear measuring probe in accordance with FIG. 1 with display and control units of various designs mounted directly on it.

FIG. 1 represents a linear measuring probe 10 which, viewed externally, consists essentially of a cylinder 1, a measuring spindle 2 which is linearly displaceable relative to this, a bellows unit 3 and a probe tip 4. The cylinder 1 advantageously has an external diameter which corresponds to the standardized diameter which is normal within the industry, for example 8 mm. It houses the guide bush for the measuring spindle 2, the components described below of a measurement transducer and an electronic circuit which conditions the signals generated by the transducer and converts them to standardized signals. At its rear end the linear measuring probe 10 advantageously incorporates a data output 5, advantageously in the form of a plug, as described below with reference to FIG. 6 by means of which it can be connected to an evaluation unit via a connecting cable. Furthermore, the linear measuring probe 10 is advantageously provided with a contact area 6 whose individual contact zones 6' are connected to the contacts of the above-mentioned electronic circuit or, if applicable, with the contact pins of the plug at the data output 5. The object of the contact area 6 is particularly to enable a cable-free connection between a display and control unit 70, 71 or 72 and the linear measuring probe 10 to be made, as described below with reference to FIG. 3.

The measuring spindle 2 is advantageously mounted without play in the cylinder 1 and is protected agains contamination by the bellows unit 3 which advantageously encloses it in a gas-tight fit. For many applications of the linear measuring probe 10 it can be appropriate to extend the measuring spindle 2 out of the cylinder 1 by means of the force of a compression spring such that the measuring spindle 2, or the probe tip 4, which is advantageously connected to its front end such that it is interchangeable, contacts a measuring point which is to be measured with a defined measuring force.

FIGS. 2a, 2b and 2c illustrate the linear measuring probe 10 in accordance with FIG. 1 with varying designs of display and control units 70, 71 and 72 attached. The housings 11 and 11' of the same are advantageously designed such that they can be attached to the linear measuring probe 10 without any possibly existing cable contact between the linear measuring probe 10 and an evaluation unit 16 having to be interrupted. The housings 11 and 11' contain a further contact area whose contact zones can contact those of the linear measuring probe 10 in the manner described above. This can be achieved either by the display and control units 70, 71 or 72 being attached to the linear measuring probe 10 by means of the arrangement described above or by the contact zones 6' of the contact area 6 of the linear measuring probe 10 running around the cylinder 1 in the form of adjacent rings and coming into contact with appropriate contact zones on the display and control unit 70, 71 or 72. In this way, the display and control unit 70, 71 or 72 can be rotated at will around the linear measuring probe 10. The design features required to achieve contact between the contact zones 6' on the cylinder 1 and the matching contact zones on the display and control unit 70, 71 or 72 are diverse and known to persons skilled in the art so that no further details need be given here.

In another embodiment not illustrated here, the display and control unit can be brought into contact with the plug at the data output 5 by means of a mating connector integrally mounted in a longitudinal bore by lowering it over the linear measuring probe 10. In this case it is advantageous for the display and control unit to have an additional plug whose contacts match those in the plug on the linear measuring probe 10.

Regardless of how and where the display and control unit 70 is connected to the linear measuring probe 10, the essential feature is that it is electrically linked with the electronic circuit in the cylinder 1. As is usual with digital display and control units, the display and control unit 70 which can be connected to the linear measuring probe 10 is advantageously provided with push buttons or similar control buttons 14 and 15 by means of which, for example, the display 12 can be zeroed, converted from millimeter to inch readings, the display scale changed or the device switched on and off. Since the electronics system of the display and control unit 70 is not part of the subject-matter of the present invention and it converts the signals generated by the above-mentioned electronic circuit in the linear measuring probe 10 into display readings by methods which are known in the art, no further details are given subsequently.

FIGS. 2a, 2b and 2c illustrate three different embodiments of advantageous display and control unit types. They are different not only in terms of their differing housing shapes but also in terms of the differing design of their display systems. The display and control unit 70 shown in FIG. 2a has a rectangular housing 11 and is provided with a single digital display 12 by means of which the measurements determined by the linear measuring probe 10 can be displayed. The display and control unit 71 according to FIG. 2b has a circular housing 11' containing two digital displays 12 and 13 operating independently of each other. The display 12, like the display 12 of the display and control unit 70 in accordance with FIG. 2a, can, for example, display the reading established by the linear measuring probe 10 starting from a absolute zero point while the display 13, for example, can display the deviation from a predetermined datum value. The two displays can also display a reading simultaneously in different units (e.g. mm and inches) or other values which are to be established. The display and control unit 72 in accordance with FIG. 2c represents combined digital/analog units with a circular housing 11'. Here too one or two digital displays 13 and 17 can be used to display different readings or different measurement scales. Parallel to this, one or two analog displays 18 and 19 can represent the reading(s) in analog form as described below with reference to FIGS. 4a to 4d.

Figure 3:
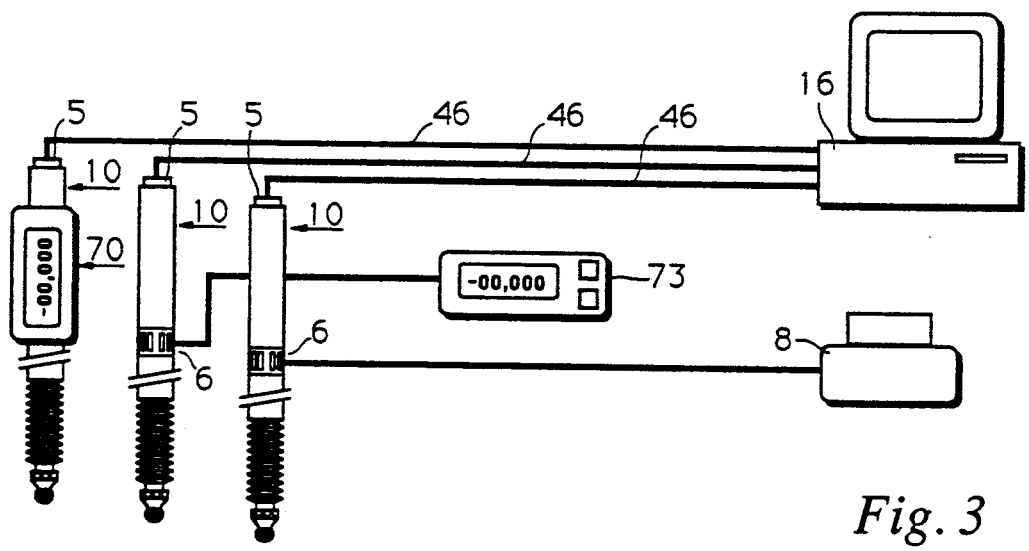
FIG. 3 shows a measurement configuration in accordance with the invention with three linear measuring probes and different display and control units and evaluation units connected to it.

FIG. 3 is a schematic representation of a measurement configuration in accordance with the invention with three linear measuring probes 10, which are all connected with an evaluation device 16 in the form of, for example, a computer, via a connecting cable 46 whose ideal structure is explained with reference to FIG. 6. One linear measuring probe 10 is further connected without a connecting cable to a display and control unit 70, while another linear measuring probe 10 is connected via an additional connecting cable to a remote display 73 which can, for example, be identical to the display and control unit 70 though this is not essential. The third linear measuring probe 10 in the measurement configuration illustrated is connected not only to the evaluation unit 16 but also to a printer 8. It is self-evident that the measurement configuration in accordance with the invention which is thus described and illustrated is by no means intended to be limiting, and that components can be combined in any other way and linear measuring probes 10 connected to other components.

FIGS. 4a, 4b, 4c and 4d illustrate advantageous display scales which can be used, for example, in a display and control unit 72 in accordance with FIG. 2c. These displays are advantageously in the form of liquid crystal, plasma or other displays which are currently in common use in many applications. The display in accordance with FIG. 4a is largely based on an analog dial gage, having a circular scale 81 running around the circumference, the divisions of which can be different from those illustrated here. Instead of using a physical rotating hand the individual segments 81' of the scale 81 can be switched on and off in a "hand mode" or gradually switched on in a "filling mode". A second scale 82 is located in the central region of the display which advantageously displays the number of revolutions of the imaginary hand or the number of passes (on/off switching) of the segments 81' by switching on appropriate lines or fields on the scale. In the embodiment illustrated, readings in millimeters and 1/100 mm can be represented. In addition to the scale 82, the central region of this display advantageously contains a window with a digital display 83 which can display in digital form either the reading represented in analog fashion by means of the scales 81 and 82 or a second reading which can be chosen arbitrarily.

The displays according to FIGS. 4b and 4c represent those of the display and control unit 72 in accordance with FIG. 2c, where the display according to FIG. 4b is designed to show an increase in the reading by clockwise motion and the display according to FIG. 4c is designed to show an increase in the reading by counter-clockwise motion. Each has an external scale 84 in which each individual line 84' advantageously represents 1/1000 mm. An inner scale 85 with, for example, ten segments 85' counts the 1/10 mm, and a first digital display 86 shows the millimeters of the reading measured by the linear measuring probe connected to the display and control unit in which the display is integrated. A second digital display 87 can be used to display a second arbitrary reading. As long as the "10-90" markings for the segments 85' are not physically printed but are also in the form of displays, a single display can be used as a clockwise or counter-clockwise dial by simple switching of the "10-90" range markings. It is self-evident in this connection the scale operating modes described above with reference to FIG. 4a can also be used with these displays.

The display illustrated in FIG. 4d is intended for a rectangular display and control unit housing, having two scales 88 and 89 by means of which millimeters and 1/100 mm can be represented in analog fashion in the display modes described above. Alternatively, the 1/1000 mm and 1/10 mm can be represented. In the alternative case mentioned, a first digital display 90 can display, for example, millimeters. A second digital display 91 can be used to display a second arbitrary reading. Since such a rectangular display has unused display space, particularly in the upper corner regions, further displays can be provided such as, for example, directional arrows to indicate the direction of the last incremental movement of the measuring spindle of the linear measuring probe, or the exceeding of tolerances or other information which would be useful in conjunction with the measurement process.

With the displays illustrated and described as well as with any others selected, the scale markings can be controlled if necessary as a function of their direction of measurement, their +/− sign or their resolution. Their +/− sign, deviations from tolerances and other criteria can be represented by different colours of the scales or background or by means of fields provided for these purposes.

A further advantageous display scale, which is well suited for use in the measurement configuration in accordance with the invention, particularly with multiprobe measurement configurations, is illustrated in FIG. 5. This is essentially a column display in which a scale 92 with segments 92' (of which only every second one is represented in the illustration for the sake of clarity) located vertically above each other enable a reading to be represented or changes in the reading in the form of an ascending or descending column. The readings superimposed on the segments 92' can be switched progressively on and off in the form of areas 93. The reading display in analog form or any other arbitrary quantity can be displayed digitally on a separate digital display 94. Other variations of displays and scale designs are self-evidently possible, for example combinations of two hands as commonly used in timing applications, and other variations. A motor drive of one or more hands is also conceivable.

FIG. 8 shows a partial longitudinal section through an advantageous embodiment of a linear measuring probe 10. The measuring spindle 2 with its associated movable parts is shown fully extended with reference to the longitudinal axis A—A of the probe in the upper half of the section and fully retracted in the lower half. In order to achieve a smooth-running motion which is free of radial play and largely unaffected by radially acting forces, the measuring spindle 2 is advantageously mounted in the cylinder 1 in a ball-bearing guide bush which, as is known, consists essentially of a ball cage 20, ball bearings 21 and a bearing sleeve 22. A pin 24 connected to the measuring spindle 2 runs in a longitudinal slot 23 in the bearing sleeve, functioning simultaneously as an antitwist and a travel-limiting device relative to the motion of the measuring spindle 2 along the axis A—A. The purpose of a groove 31 at the front end of the bearing sleeve 22 is to accommodate the bellows system 3 which is not shown in this figure. A sealing ring 32 provides a hermetic seal between the bearing sleeve 22 and the cylinder 1.

In the embodiment illustrated here of an advantageous linear measuring probe 10, the probe is provided with a compression spring 25 which, on the measuring spindle side, rests against a ring 27 held in position by a spring washer 26 and a spacer sleeve 28 At its other end it rests against a throat 35 in the cylinder 1. When the linear measuring probe 10 is in its initial position, the measuring spindle 2 is extended axially out of the cylinder 1 as far as the stop of the antitwist pin 24 at the outer end of the longitudinal slot 23 as a result of the force applied by the compression spring 25. The measuring force changes in accordance with the spring constant over the whole spindle stroke. Since this must be as constant as possible for many applications, however, it is important to choose a compression spring 25 with a low spring constant or to generate the measuring force in another manner, as described below.

A transducer 36, as shown in FIG. 7, is accommodated in line with the longitudinal guide bush of the measuring spindle 2. It converts the axial motion or position of the measuring spindle 2 into electrical signals which are converted into standardized, advantageously digital signals by the electronic circuit 30 such that they can be converted into display readings or be otherwise processed in an independent apparatus such as e.g. the evaluation unit 16. The said electrical signals are further advantageously processed in such a way by the electronic circuit 30, that the measure value can be displayed in the display and control unit 70. A plug is inserted in the cylinder section 1' and connected to the electronic circuit 30 in such a way that standardized, advantageously digital signals are available on it. This plug comprises essentially an insulation element 37 in which contact pins 38 are inserted. It contains furthermore a bore 39 and a sealing ring 40.

At the rear end of the measuring spindle 2 is a screen 41 which is a movable element of the transducer according to FIG. 7. Within this screen 41 which can move axially with the measuring spindle 2 a cylindrical pickup electrode 42 is concentrically located and held in place by means of a tube 55 and an insulation material 56 lying above this. The tube 55 is coaxially attached to an external sleeve 57 of the transducer by means of a centering piece 43. The sleeve 57 has grid electrodes 44 of the transducer in its inner diameter which are connected to the electronic circuit 30 through a slot 58. The centrally located, highly sensitive pickup electrode 42 is connected to the electronic circuit 30 by means of a lead 59 through the tube 55.

FIG. 6 illustrates the connection of the linear measuring probe 10 or its data output 5 through the plug to a cable 46 by means of a cable connector 45. The insulating element 37 with its bore 39, the sealing ring 40 and one of the contacts 38 can be seen in partial section. The cable connector 45 contains a number of contact sockets 47 to provide the electrical contacts with the pins 38 and a duct 52 for a pressure medium (gas or liquid), the end part 53 of which can be hermetically connected with the bore 39 by means of the sealing ring 40. As an alternative to a separate duct 52 in the cable 46, hollow spaces within the cable sheath 46' can be used to transmit pressure. In this case, a sealing lip 48 provides the gastight connection between the plug of the data output 5 and the cable connector 45. In addition to the electrical leads 50 and the pressure duct 52, fiber-optic light guides can also be contained within the cable sheath 46'.

The motion, position, speed and measuring force of the measuring spindle 2 can be controlled by changing the pressure of the pressure medium in the duct 52. If a vacuum is created the measuring spindle 2 is pressed against the inner stop against the force of the compression spring 25 by means of the axial force component of the atmospheric pressure. In order that the measuring force remains constant over the measuring stroke, this force can be generated by overpressure in the duct 52 and thus in the cylinder 1 instead of by means of the compression spring 25. Instead of changing the measuring force by replacing the compression springs 25, as is the current practise, it can be adapted to the requirements of the particular measurement application simply by regulating the overpressure in the cylinder 1.

FIG. 7 is a schematic representation on an enlarged scale of an advantageous design for the transducer 36 as used in the linear measuring probe in accordance with FIG. 8 and described with reference to it. The tubular screen 41, which is advantageously firmly attached to the rear end of the measuring spindle 2 and is thus displaced with this along the axis A—A, is configured coaxially about the essentially cylindrical pickup electrode 42 which is located and fixed in the axis A—A. This screen 41, at least partially manufactured of electrically conductive material, has alternating continuous and broken areas. The screen 41 is surrounded externally by coaxially cylindrical grid electrodes 44 in the form of, for example, electrode surfaces applied to a cylindrical substrate.

Persons skilled in the art will recognize that the transducer 36 described above is a linear capacitive transducer whose effect and operation are known, although it diverges substantially in its design from the known elements of this type since it is constructed cylindrically and its active components are coaxially configured.

The capacitive measuring element is perfectly screened against external interference by means of the coaxial configuration as described above of components 41, 42 and 44 of the transducer 36. The sensitive pickup electrode 42 is located in the centre, surrounded by grid electrodes 44 powered by a low impedance source. A coaxial configuration of all the linear measuring probe and transducer elements enables small radial dimensions to be achieved. Rotationally symmetrical components can be manufactured simply, cheaply and with high precision. Measurements are conducted strictly according to Abbe's law.

Persons skilled in the art will recognize that other linear transducers can self-evidently also be used instead of the capacitive transducer 36 described. By way of example, optical, inductive and magnetic transducer systems are simply listed here. When capacitive transducers are used, a system can be applied which encompasses a linear and planar scale which serves as a passive reflector. The use of a planar scale in the form of an electrostatic screen between the planar grid- and pickup electrodes and the use of a scale with divisions made of insulators with various dielectric constants are also possible, as is the integration of electrodes and at least part of the electronic circuit on one and the same substrate. In order to reduce the assembly dimensions perpendicular to the direction of measurement the transmitting or grid electrodes and one or a plurality of pickup electrodes can be located at an angle, for example 90°, relative to each other.

The capacitive transducer 36 described above can advantageously contain cylindrical grid electrodes 44 which are manufactured in planar fashion on a flexible printed circuit, into which the electronic circuit 30 is also inserted, and then rolled up. Alternatively, a capacitive transducer can be constructed helically with a coaxial structure in that the grid electrodes are applied helically to a cylindrical substrate or consist of a single-layer winding of a plurality of parallel conductors. The electrically conductive and insulating zones of the electrostatic screen are correspondingly also helically configured. The consequence of this helical structure is that the transducer generates an output signal as a result both of a linear displacement of the screen and of a rotation about its longitudinal axis and thus can also be used as a rotary encoder or as a combined rotary encoder/linear measuring probe.

The screen 41 in accordance with FIG. 7 can be manufactured from a cylindrical tube of electrically conductive material, where the holes are etched, punched, cut out by laser or produced by some other means known to persons skilled in the art. It can, however, also be manufactured in planar fashion and subsequently rolled into a cylindrical shape or some other expedient shape. The use of a dielectric substrate with electrically conductive zones applied to it is also conceivable.

The advantageous linear measuring probe 10 described above with reference to the accompanying drawings is, as already mentioned, equipped with a plug at its data output 5 which includes both the electrical connections required to bring out the standardized signals generated by the electronic circuit 30 and a connection to control the measuring spindle movements. The signals from the transducer are advantageously converted into standardized digital signals in the electronic circuit 30 in accordance with the RS-232 standard which is usual with computers, printers and other evaluation devices. The power supply for the electronic circuit 30 can advantageously be provided via the cable 46 or by a battery in the display and control unit 70.

Persons skilled in the art will recognize that, thanks to the new linear measuring probe 10 with output signals in the standardized digital form and with integrated contacts for direct connection to a display and control unit independent of connecting cables and as a result of the integrated design of the electrical and pneumatic or hydraulic connections, the measurement configuration according to the invention offers considerable advantages over the present, conventional measurement configurations with linear measuring probes; these advantages extend far beyond the fact that as a result of the invention it is possible for the first time to use a linear measuring probe with externally controlled motion of the measuring spindle without additional connecting cables and pneumatic or hydraulic hoses to control the measuring spindle movements and that a display and control unit can be directly attached thanks to the electronics systems contained in the linear measuring probe. A linear measuring probe in a measurement configuration according to the invention fitted with a display and control unit 70 is thus much handier to use and can therefore be used more easily and in a more versatile fashion than all linear measuring probes currently in common use in conjunction with digital or analog displays. As a result of the invention it is also possible for the first time to use an electronic linear measuring probe in conjunction with a display and control unit which can be attached to it directly as a probe/dial gauge, which display and control unit can be removed without losing the calibrated values once the measuring station has been set up.

The coaxial configuration of the transducer components or the configuration of all the components of a non-coaxial transducer together with the electronics system which processes the transducer signals and converts them to standardized signals in a cylinder with a standardized diameter together with the integration of a pneumatic or hydraulic duct in an electrical output to connect the linear measuring probe with an evaluation unit pave the way to new applications for the measurement configuration in accordance with the invention and its components, especially the linear measuring probe, which have not been possible to date because of the inherent disadvantages of the conventional linear measuring probes currently available.

With probes measuring absolute values it is not a displacement of the measuring spindle 2 from a reference point which is measured but rather a value is assigned to each position of the measuring spindle 2 relative to the cylinder 1. This value is retained even after interruptions to the power supply without electronic memories being required. In certain applications, for example with multi-probe measurement stations which may occasionally be disconnected from the power supply or may not be used for lengthy periods, the use of an absolute-measuring probe is advantageous. With absolute-measuring probes the entire measuring range is included in an interpolation. The primary object of the electronic circuit 30 is to generate an electrical signal which bears a relation to the relative position of the measuring spindle 2 to the cylinder 1, but it can also contain parts which serve to linearize the characteristic curve. It consists advantageously of one or a plurality of integrated circuits and the necessary discrete components. The electrical signal can be, for example, a voltage, a current, an impedance, a frequency or a pulse sequence, in standardized form so that a direct connection to common instruments and devices is possible.

It is self-evident that the cylinder 1 of the measuring probe 10 must not have an uniform cylindric section over the entire length, if a different shape suits better.

What I claim is:

1. A measurement configuration comprising at least one electronic linear measuring probe and at least one output display and control means wherein said linear measuring probe comprises an outer cylindrical housing, an extendable and retractable measuring spindle cooperating with said housing, sealing means between said housing and said spindle, a linear transducer generating measurement signals, electronic circuitry converting said transducer signals into standardized output data, output connector means for connection to said output display and control means, and means for adjusting the measurement force of said probe; characterized in that said electronic circuitry and transducer are contained within said cylindrical housing, said transducer being associated with the inner end of said spindle, and said sealing means comprises a longitudinally expansive and contractive, gas tight bellows attached between an end of said housing and said spindle.

2. The measurement configuration according to claim 1, characterized in that said electronic circuitry converts electrical signals generated by said transducer into standardized digital and/or analog measurement signals.

3. The measurement configuration according to claim 1, characterized in that the active components of said transducer are coaxial with the longitudinal axis of said linear measuring probe.

4. The measurement configuration according to claim 3, characterized therein that the active components are helical.

5. The measurement configuration according to claim 3, characterized in that said transducer is a capacitive measurement element wherein grid electrode form a tubular component coaxial with the longitudinal axis of the linear measuring probe, within which a screen is located as a second tubular, coaxial component, within which a pickup electrode lies as a third coaxial component.

6. The measurement configuration according to claim 5, characterized in that said screen is connected to said measuring spindle and can be displaced together therewith along the longitudinal axis of the linear measuring probe.

7. The measurement configuration according to claim 5, characterized in that the grid electrodes consist of a rolled-up, flexible, printed circuit which has been manufactured in planar fashion.

8. The measurement configuration according to claim 5, characterized in that the screen consists of a flexible, rolled-up material.

9. The measurement configuration according to claim 5, characterized in that the screen consists of a cylindrical tube which has been treated by a laser, etching or punching process or manufactured by means of coating of a tubular, dielectric material.

10. The measurement configuration according to claim 1, characterized in that the transducer consists of planar active components located side by side.

11. The measurement configuration according to claim 10, characterized in that at least part of the active components are angled.

12. The measurement configuration according to claim 10, characterized in that grid electrodes and at least a part of the electronic circuitry are located on a common substrate.

13. The measurement configuration according to claim 10, characterized in that at least one pick-up electrode and at least a part of the electronic circuitry are located on a common substrate.

14. The measurement configuration of claim 1 wherein said output connector means comprises an annular contact area around the outer surface of said housing having at least one contact zone electrically connected to said electronic circuit and providing electrical contact for connection of said display and control means.

15. The measurement configuration of claim 1 wherein said output connector means comprises a plug means in said housing having at least one contact electrically connected to said electronic circuit and having means by which a measurement force adjusting means may be attached.

16. The measurement configuration of claim 15 wherein said plug means is located in an end of said housing and includes a longitudinal passage therethrough and said measurement force adjusting means comprises a pressure medium appliable within said housing by means of an adapter insertable into said longitudinal passage.

17. The measurement configuration of claim 1 characterized in that said output connector means comprises an annular contact ring around the outer surface of said housing and a plug receptacle longitudinally located within one end of said housing, said plug receptacle and said contact ring having at least one electrical contact means each electrically connected to said electronic circuit whereby two output displays and control means may be connected to said probe and wherein said plug receptacle includes means for connection to a pressure medium for effecting pressure changes within said housing.

18. The measurement configuration of claim 1 wherein said output display and control means comprises at least one display means selected from the group consisting of digital, analog, linear, circular, numerical and iconographic display elements.

19. An electronic measurement configuration comprising a plurality of linear probes characterized in that said probes have at least two electrical contact means at different locations thereon for connection of said probes to a plurality of display and control units wherein at least one of said display and control units is remote from said probes and is connected thereto by a cable means and at least one of said display and control units is adjacent to at least one of said probes and is directly connected to one of said electrical contact means by a cable-free connection;

said probes further characterized in having means whereby measuring force is adjustable by the application of fluid pressure through said cable means and wherein measurement signals are generated by a linear transducer means and associated electronic circuitry within said probes, said signals being output to said display and control means via said electrical contact means as standardized digital and/or analog data.

* * * * *